Jan. 8, 1952  H. DE FRANCE  2,582,013
MOVING PICTURE PROJECTION DEVICE
Filed Jan. 30, 1942  2 SHEETS—SHEET 1

INVENTOR
HENRI DE FRANCE
BY Bailey, Stephens & Huettig
ATTORNEYS

Jan. 8, 1952     H. DE FRANCE     2,582,013
MOVING PICTURE PROJECTION DEVICE

Filed Jan. 30, 1942     2 SHEETS—SHEET 2

INVENTOR
HENRI DE FRANCE
BY
Bailey, Stephens & Huettig
ATTORNEYS

Patented Jan. 8, 1952

2,582,013

UNITED STATES PATENT OFFICE 2,582,013

MOVING PICTURE PROJECTION DEVICE

Henri de France, Lyon, France

Application January 30, 1942, Serial No. 428,971
In France October 11, 1941

Section 3, Public Law 690, August 8, 1946
Patent expires October 11, 1961

1 Claim. (Cl. 88—17)

The present invention relates to moving picture transmission devices.

The chief object of my invention is to facilitate the successive projection of two films.

Preferred embodiments of the present invention will be hereinafter described with reference to the accompanying drawings given merely by way of example and in which.

In the following description, it will be assumed that it is desired successively to transmit a plurality of films through a telecinema system.

Figure 1:
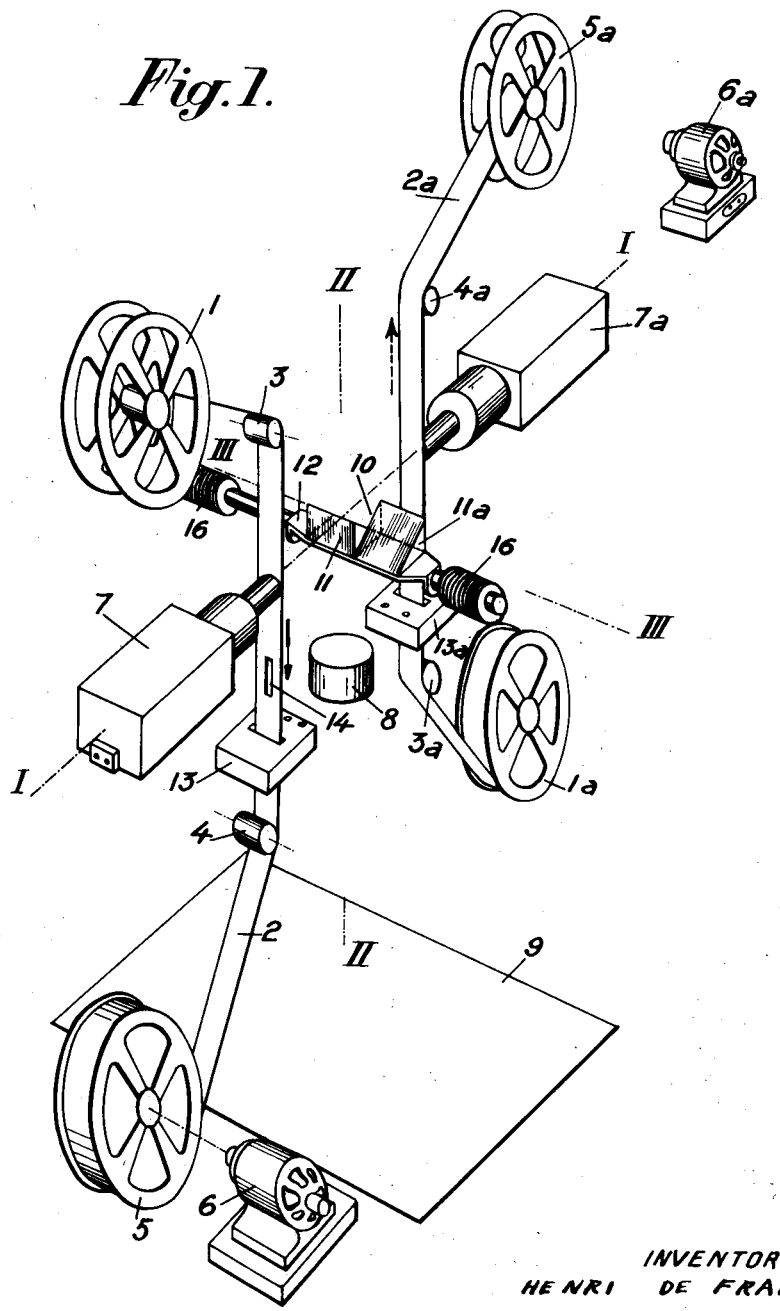
Fig. 1 is a diagrammatical perspective view of a telecinema transmission device made according to an embodiment of the invention.

I provide in the usual manner, on the one hand, a film unwinding apparatus, the chief elements of which are shown by Fig. 1, to wit: a spool 1, for the unwinding of film 2, two rollers 3 and 4 for guiding said film, preferably in a vertical direction, and a second spool 5 for the winding of the film, which is driven by means of an electric motor 6, preferably independent.

On the other hand, I dispose a film illuminating apparatus 7 in such manner that the optical axis of said apparatus is at right angles to the film, that is to say horizontal in the example illustrated by the drawing.

Finally, I make use of an objective 8 adapted to receive the illuminated image of film 2 and to give an image thereof on a viewing screen 9.

It will be supposed that it is desired to operate such a device and that the film is going to be wholly unwound. It is clear that a certain time will be necessary for the replacement of the film which has just been projected by the next film which follows.

In order to obviate this drawback, according to the present invention, I provide, in such a projection system, a second unwinding device, the chief elements of which are shown in Fig. 1 by the same reference numerals, but carrying index a, as the coresponding elements of the first unwinding device. The second unwinding device is adapted to receive, during the operation of the first unwinding device, film 2a which is to follow the film that is being projected.

I further provide an illuminating device for illuminating film 2a. For this purpose, I make use of an apparatus 7a distinct from apparatus 7 and which is placed, relatively to film 2a, in a position analogous to that of apparatus 7 with respect to film 2.

It would be possible further to duplicate the first described transmission device and to provide a second iconoscope or like apparatus, fitted with its objective. In this way, I would obtain a device permitting to pass immediately from the projection of the first film to that of the next one.

According to my invention, both of the unwinding devices are arranged in a symmetrical manner, illuminating apparatus 7 and 7a being directed toward each other along a common axis I—I.

Thus after viewing screen 9 and objective 8 have been placed coaxially with each other along an axis II—II equidistant from the respective portions of films 2 and 2a, and at a suitable distance, it is possible to reflect along axis II—II the light beams emitted respectively and successively by the illuminated image of films 2 and 2a, through an optical device 10 capable of occupying two different positions.

In the example illustrated by the drawing, this device 10 consists of a pair of right-angled prisms 11 and 11a, the planes of the reflecting faces of which are at right angles to each other and intersect each other along a line III—III perpendicular to lines I—I and II—II and passing through the point of intersection of these two last mentioned lines. These prisms are mounted in a holder 12 adapted to slide parallelly to line III—III on a support which is not shown by the drawing.

In the system which has just been described, when film 2 for instance is nearing the end of its projection, it suffices to start the unwinding of film 2a and simultaneously to shift optical device 10 to its second position, for obtaining the desired continuous projection.

The system further includes a device for automatically performing, at the proper time, the shifting from the projection of one film to that of the next one.

Figure 2:
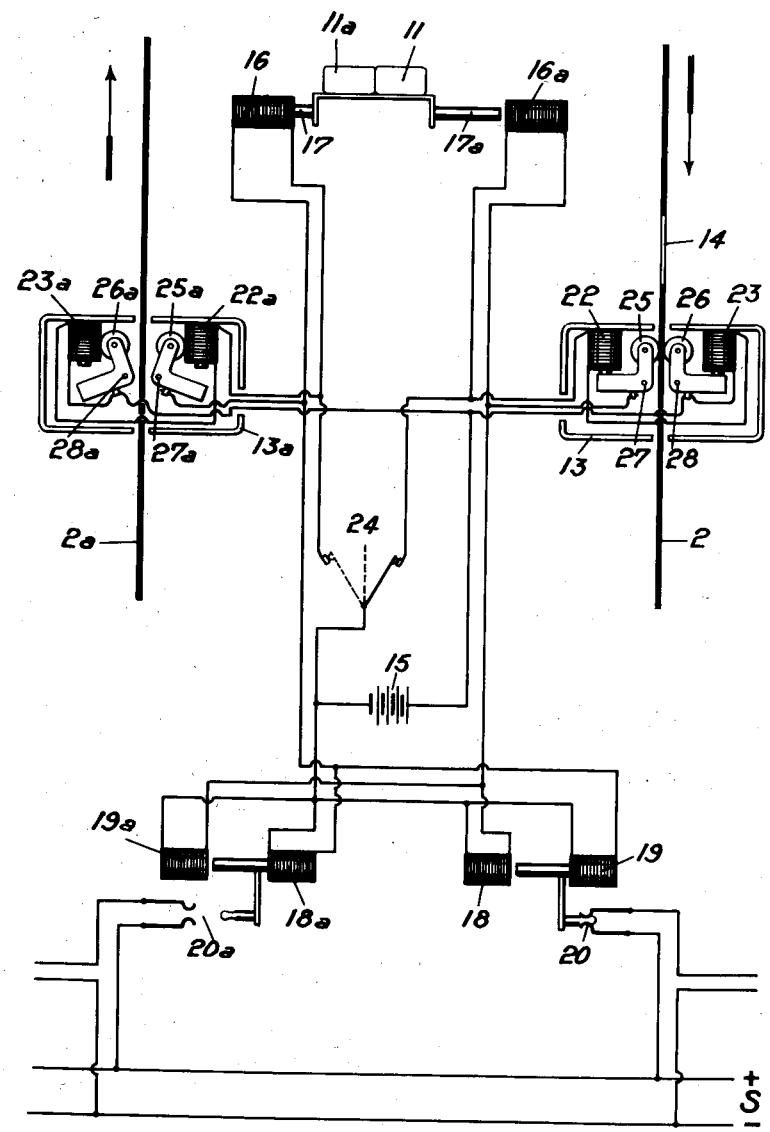
Fig. 2 shows, also in a diagrammatic manner, a device for automatically shifting from one film to the other.

Such an automatic control device may be made for instance in the following manner as shown by Figures 1 and 2.

The film is caused to pass through an apparatus 13 including electric contact means operated by the passage of a slot 14 provided in film 2 at the point of said film where it is to be replaced by film 2a for projection purposes.

The electric contact thus made connects with the terminals of a battery 15 electric circuits (shown only by Fig. 2) which respectively include:

(a) An electro-magnet 16a adapted to act on a core 17a so as to bring optical device 10 into the position thereof where prism 11a is being utilized;

(b) Two electro-magnets 18 and 19a, the first of which is adapted to open switch 20 which controls the connection with a current distribution line S of the circuits through which motor 6 and illuminating aparatus 7 corresponding to film 2, are fed with electric current, while the second, to wit 19a, closes switch 20a which plays the same part with respect to devices corresponding to film 2a.

On the other hand, it is advantageous to avoid having the contact elements of contacting device 13 uselessly in frictional contact with film 2 over the whole length thereof. Consequently, contacting device 13 is fitted with two electro-magnets 22 and 23, which are energized a short time before the end of the film through a revolving switch 24 and which apply against each other metallic contact rollers 25 and 26, normally held biased away from the film by the action of soft iron counter-weights pivoted about axes 27 and 28 respectively and also included in an electric circuit.

On the other hand, switch 24 is capable of occupying a third position corresponding to the first operation, that is to say the shifting from the projection of film 2a to that of film 2, this operation being produced by an electric device analogous to that which has just been described and capable of displacing prisms 11—11a in the opposite direction.

In a general manner, while I have in the above description disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

A moving picture projection device which comprises, in combination, two films, means for unwinding one film along a given path, means for unwinding the other film along a different path, means for projecting a light beam across the path of unwinding of the first mentioned film, distinct means for projecting a light beam across the path of unwinding of the second mentioned film, a single objective for both of said light beams, shiftable optical reflecting means adapted to occupy either of two positions, in one of which said optical means reflect along the axis of said objective the light beam from one of said projecting means after its passage through the corresponding film and in the other of which said optical means reflect along the same axis the light beam from the other of said projecting means after its passage through the corresponding film, each of said films being provided with marking means near one end thereof, and a mechanism operative by each of said film marking means for automatically shifting said optical means from one position to the other as the film which is being unwound brings said marking means in cooperating relation with said mechanism.

HENRI DE FRANCE.

REFERENCES CITED

The following references are of record in the file of this patent:

UNITED STATES PATENTS

| Number | Name | Date |
|---|---|---|
| 963,125 | Dyer et al. | July 5, 1910 |
| 1,467,466 | Willard | Sept. 11, 1923 |
| 1,700,833 | Engel | Feb. 5, 1929 |
| 1,802,595 | De Forest | Apr. 28, 1931 |
| 1,888,276 | Loehr, Jr., et al. | Nov. 22, 1932 |
| 1,894,265 | Chretien | Jan. 17, 1933 |
| 2,069,631 | Thomas | Feb. 2, 1937 |
| 2,138,478 | Pedatella | Nov. 29, 1938 |
| 2,138,479 | Pedatella | Nov. 29, 1938 |

FOREIGN PATENTS

| Number | Country | Date |
|---|---|---|
| 225,631 | Great Britain | Dec. 8, 1924 |
| 398,228 | Great Britain | Sept. 11, 1933 |
| 417,181 | Great Britain | Sept. 28, 1934 |